Oct. 9, 1956    J. E. LYDLE    2,765,841
APPARATUS FOR SEATING THE BEADS OF TUBELESS
TIRES BY PERIPHERAL PRESSURE
Filed Sept. 13, 1954    2 Sheets-Sheet 1
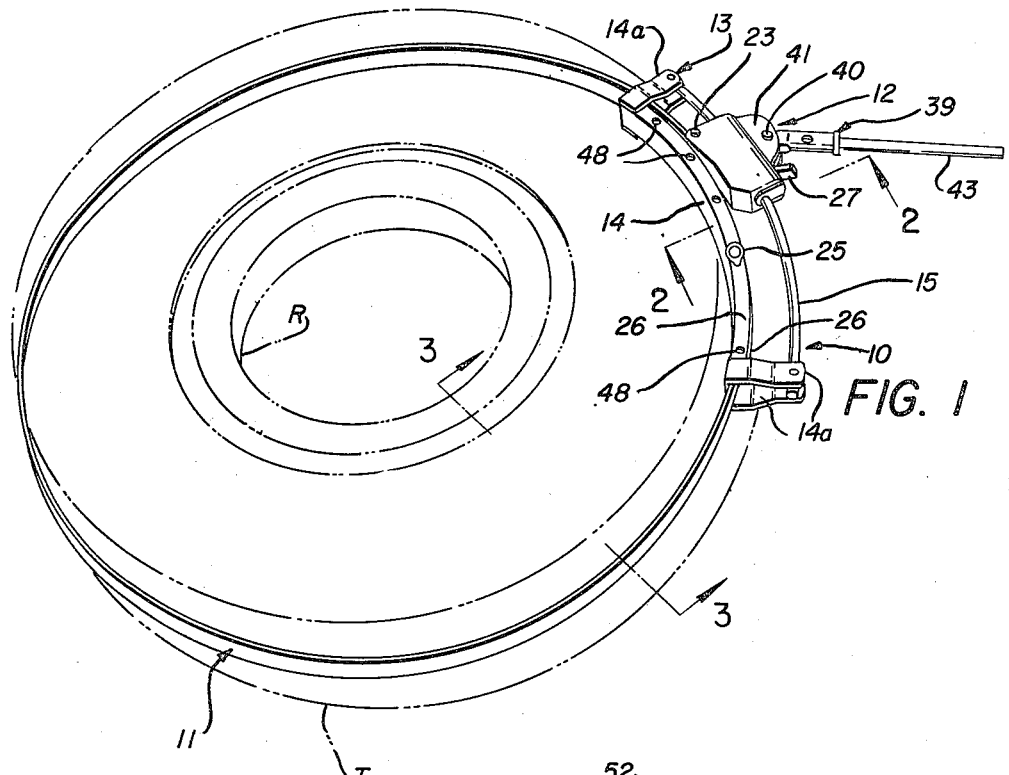
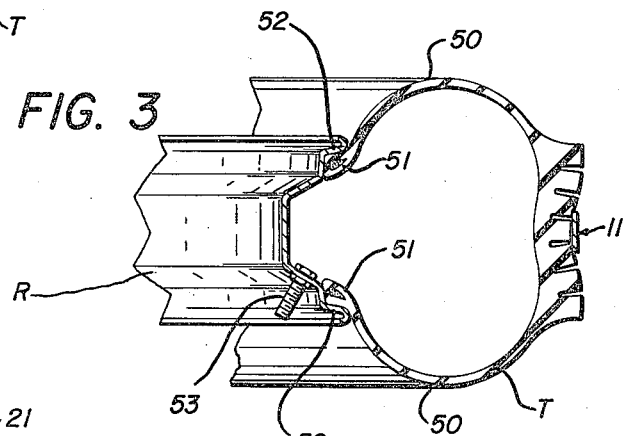
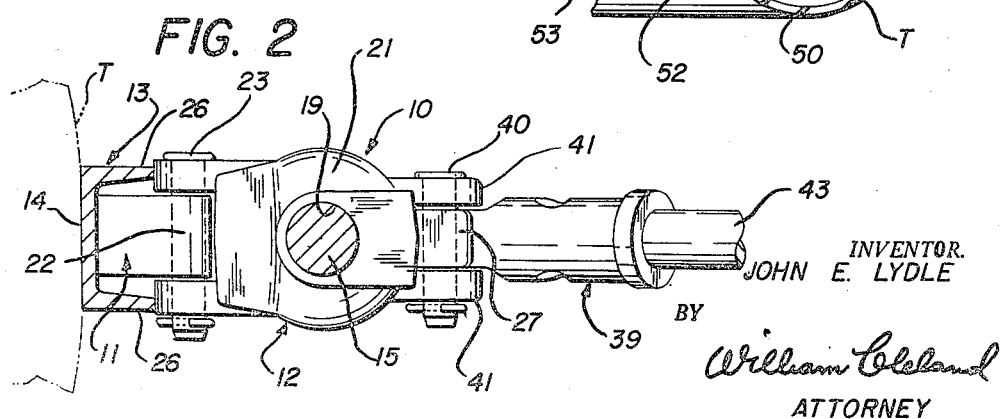
INVENTOR.
JOHN E. LYDLE
BY
William Cleland
ATTORNEY

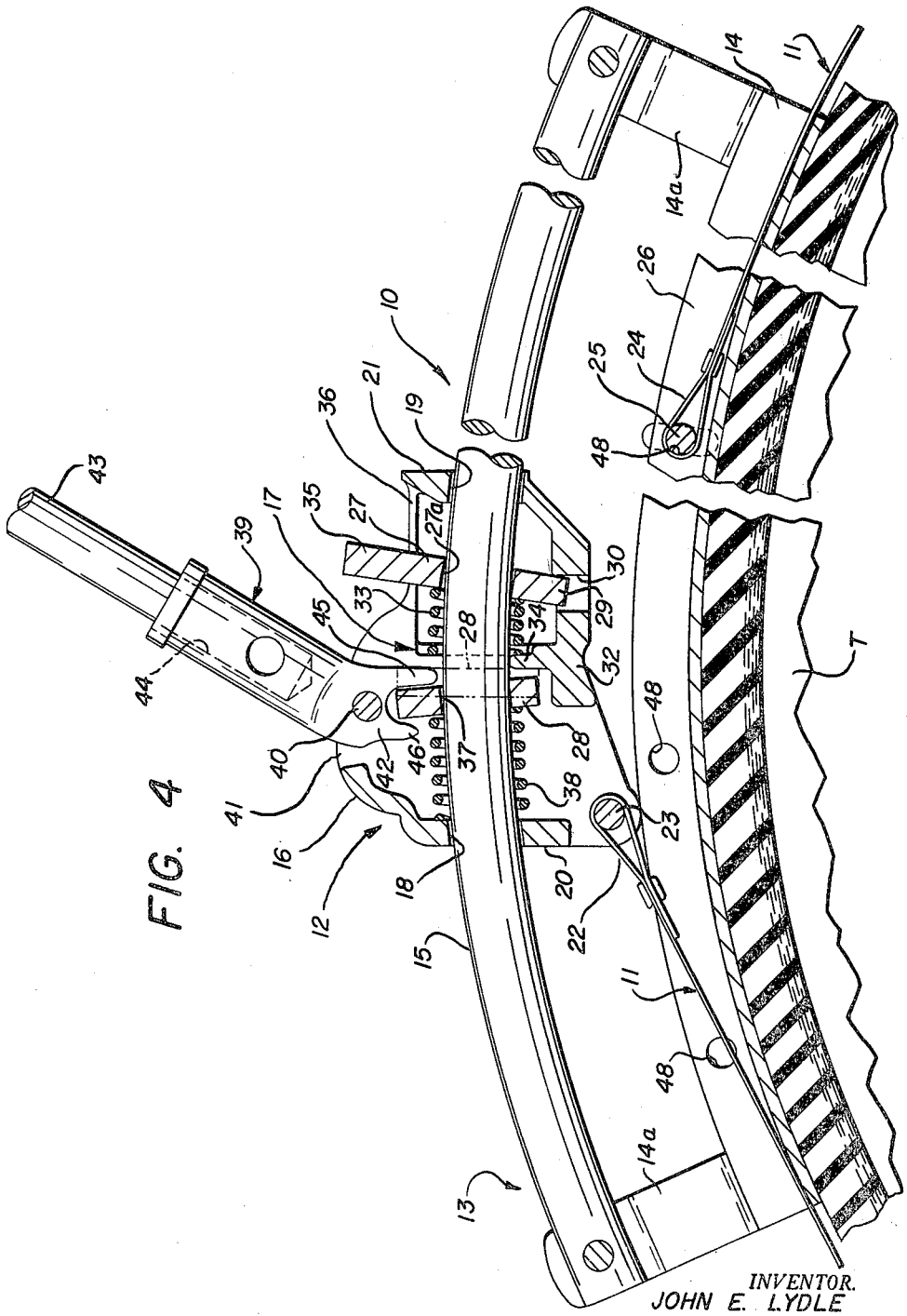

2,765,841
APPARATUS FOR SEATING THE BEADS OF TUBELESS TIRES BY PERIPHERAL PRESSURE

John E. Lydle, Akron, Ohio, assignor to The Ken-Tool Mfg. Company, Akron, Ohio, a partnership of Ohio Application September 13, 1954, Serial No. 455,538

4 Claims. (Cl. 157—1.1)

This invention relates to tire bead spreading or expanding tools, and in particular relates to apparatus for mounting tubeless tires on vehicle rims.

Heretofore, devices have been provided for the purposes described, including the type having means for tightening a split band around the tread periphery of a tire. These, however, have been objectionable for various reasons, such as that they were cumbersome to handle and initially adjust to the tire, difficult to operate, and difficult if not impossible to adjust to the tire simultaneously with raising and/or lowering of the inflation pressure applied to the tire in the mounting operation thereof.

One object of the invention is to provide an improved tubeless tire mounting device of the character described, which is easy to apply to a tire and to rapidly spread the tire beads apart to air-sealed seating relation in bead seats of a rim, and in a manner which makes spreading the tire beads, inflating the tire to full pressure, and removing the mounting device, a substantially continuous operation.

Another object of the invention is to provide a device of the character described which utilizes the inherent resiliency of the tire being mounted to facilitate holding a band of inextensible material, embracing the tire, in various given positions of tensional adjustment thereon.

Another object of the invention is to provide a simple tire bead expander of the character described which is quickly releasable upon completion of a tire mounting operation, and yet is completely safe to operate at all times.

Other objects of the invention will be manifest from the following brief description and the accompanying drawings.

Of the accompanying drawings:

Figure 1 is a perspective view, of a tire bead expander embodying the features of the invention, in position for operation on a tire and rim assembly, shown in chain-dotted lines.

Figure 2 is an enlarged cross-section of the bead expander, taken substantially on the line 2—2 of Figure 1.

Figure 3 is a cross-section, taken substantially on the line 3—3 of Figure 1, but illustrating the tire and rim in full lines, and with the tire beads expanded into seating position on the rim.

Figure 4 is a greatly enlarged cross-section, partly broken away, of a tightening mechanism of the expander, taken on a plane which would be radially of the tire and passing substantially through the transverse centerline thereof.

Referring to the drawings generally, there is shown a tire expander or bead spreading tool 10, including a split band 11 of inextensible material, such as thin spring steel, and a tightening unit 12 connected across opposite ends thereof in a manner and for purposes to be described later.

The tightening unit 12 may include a supporting member 13 having an arcuate base 14 of rigid metal and of channel-shaped cross-section, adapted to conform to the outer tread periphery of a tire T, and a rigid coextensively arcuate bar 15 of round cross-section, supported in radially outwardly spaced relation to said base, between pairs of transversely spaced lugs 14a, 14a at opposite ends of said base. Unit 12 also includes a housing 16 for a gripping mechanism 17, said housing having openings 18 and 19 in opposite end walls 20 and 21 thereof slidably receiving the rod 15, and the gripping mechanism being operable with mechanical advantage, progressively to move the housing to locked positions along the bar. The band 11 has one looped end 22 connected to an anchor pin 23 extending between opposite side walls of housing 16 and the other looped end 24 connected to anchor pin 25 extended between opposite side flanges 26, 26 of base 14. Gripping mechanism 17 is designed to be manually operable to advance the housing forwardly to locked positions in which the ends 22 and 24 of the band 11 are moved closer together to tighten or contract the band about tire T.

Accordingly, the tightening mechanism 17 may include a first dog or plate 27 having an aperture 27a slidably receiving bar 15 therethrough, and canted for locking the housing in a given position on bar 15, against tension applied to band 11 in use of the device, and a second dog or plate 28 used as a movable fulcrum means for advancing the housing along the bar. Locking dog 27 has an inner extension 29 pivotally received in an aperture 30 in an inner wall 32 of the housing and a compression spring 33 engaged between this dog and a suitable transverse wall portion 34 of the housing, thereby yieldingly urging said dog to said canted position, in which diagonally opposed sharp edge portions defined by the opening 27a, bite into correspondingly opposite sides of the bar, as shown in Figure 4, effectively to prevent relative movement of the housing in a reverse direction (toward the left of Figure 4). An extension 35 of dog 27, presented outwardly of the housing, through an opening 36, is engageable by a suitable tool to release said grip in a manner to be described later. The second dog or plate 28 also has the bar 15 slidably received through an opening 37 therein, and a spring 38 extended between the end wall 20 of the housing and the dog 28 normally tends to urge the dog to an inoperative stop position against said housing wall portions 34. For progressively moving housing 16 along bar 15, however, a lever 39, pivoted on a pin 40 between opposite side wall portions 41, 41 of the housing, has a bifurcated end 42 extending inwardly to embrace the outer edge portion of dog 28. Thus, by moving an outwardly extending handle 43, removably received in a socket 44 in lever 39, forwardly (to the right in Figure 4), a forward tang 45 of bifurcation 42 engages the outer edge portion of dog 28 and immediately cants the same in direction reversely of that of locking dog 27, against the yielding action of spring 38, so that upon continued forward movement of the lever handle the locked dog 28 serves as a fixed fulcrum on the rod 15 (see Figure 4), whereby through leverage applied at pivot pin 40 the housing is moved forwardly on the rod for a relatively short distance to draw the anchored ends 22 and 24 of band 11 closer together. With this forward movement of housing 16 the locking dog 27 is correspondingly moved along the rod by the movement of spring 33, but the moment the stroke of lever 39 is reversed, to the left of Figure 4, a rear tang 46 of lever bifurcation 42 releases fulcrum dog 28, simultaneously with forward canting of locking dog 27 by spring 33 again to lock the housing on the rod 15. This forward movement of housing 16, to similarly locked positions on bar 15, may be progressively accomplished by rapid forward and rearward reciprocation of the lever 39, until the tension on band 11 is sufficient for its intended purposes.

In order quickly to adapt the tire expanding device 10 for use on different sized tires T, the anchoring pin 25 is releasably receivable between peripherally spaced pairs of aligned apertures 48, 48 in the opposite side flanges 26 of base 14.

In use of the improved expander 10, for mounting a tire T on a wheel rim R, the operator first adjusts the forward anchoring pin 25 between a requisite pair of holes 48 in base 14 to suit a given size of the tire T. He also adjusts the device so that the housing 16 will be at the rearmost or released position thereof, namely toward the extreme left of Figure 4.

With the tire and rim assembly in horizontal position, on a tire changer, bench, or on the floor, the operator, while gripping the forward portion of bar 15 with one hand and housing 16 with the other, may readily slip the band 11 and member 13 around the outer tread periphery of the tire, centrally thereof, as shown in Figures 1 to 4. Almost simultaneously with this action the operator may pull the member 13 toward him to maintain tension on band 11, applied between the two anchoring pins 23 and 25 against the inherent resiliency of the tire T. Immediately thereafter the operator may start forward and rearward reciprocation of lever 39, by means of handle 43 in the socket portion 44 thereof, whereby fulcrum dog 28 and locking dog 27 are alternately canted and released in fulcruming and locking positions, respectively along the bar 15. In this way the housing is progressively moved forwardly, first to tighten the band 11 sufficiently to hold the expander on the tire, and then to distort the tire tread uniformly radially inwardly around the tread periphery, as shown in Figure 3, such distortion being effectively transmitted to the tire sidewalls 50, 50 in a manner which expands the beads 51, 51 thereof oppositely outwardly into airsealing relation in the usual bead seats 52, 52 of rim R (see Figure 3). At this point the operator may apply air, at from five to ten pounds per square inch, to the interior of the tire, by means of an air hose (not shown) connected to a valve stem 53 on the rim, or until sufficient pressure is applied to maintain an air seal. Should leakage occur, a sharp blow applied to the band 11 at the point of leakage will cause the beads to expand as necessary to seal completely at that point.

As soon as the beads 51 are sealed sufficiently to hold air in tire T, the operator may remove lever handle 43 from its socket 44, and insert an end of the same forwardly between the locking dog 27 and the adjacent end wall 21 of housing 16. Now, using the handle as a lever, the locking dog may be released with respect to bar 15, the fulcrum dog 28 being already in released position (see chain-dotted position in Figure 4), whereby resultant expansion of the tire will also expand the band 11 and move the housing rearwardly, or to the left as viewed in Figure 4, and the expander immediately may be removed from the tire. At this point the operator again utilizes the bar 15 as a handle, this time for removing the expander from the tire. After removal of the expander, the tubeless tire T may be further inflated to requisite full pressure.

The tool operation described above may be accomplished rapidly and entirely without awkwardness or fumbling, and without endangering the operator.

Modifications of the invention may be resorted to without departing from the spirit thereof or the scope of the appended claims.

What is claimed is:

1. Apparatus for mounting tires on vehicle rims, comprising an elongated rigid support having a rigid bar affixed thereon to coextend in spaced relation to the same, a housing slidable along said bar, a split band of substantially inextensible material anchored at one end thereof to said housing and at the other end to said member support, a first spring-pressed dog pivoted on said housing and having edge portions for biting into said bar in a spring-urged canted position of the dog to lock the housing on the bar in a tensioned condition of said band between the anchored ends thereof and against the resiliency of a tire about the outer tread periphery of which said band is engaged, a second spring-pressed dog having edge portions adapted to bite into said bar in an oppositely canted position in which the dog is locked on the bar, an operating lever pivoted on said housing and having an extension engageable with said second dog, whereby forward pivotal movement of said lever fulcrums said lever extension on the locked second dog and urges said housing forwardly along the bar to increase the tension of said band, said forward movement of said housing thereby urging said first dog to a new position along the bar, but the tendency of said housing yieldingly to reverse travel thereof upon reversing the stroke of said lever permitting said first dog to be yieldingly canted and locked in said new position on the bar.

2. Apparatus for mounting tires on vehicle rims, comprising an elongated rigid support having a rigid bar affixed thereon to coextend in spaced relation to the same, a housing slidable along said bar, a split band of substantially inextensible material anchored at one end thereof to said housing and at the other end to said support, a first spring-pressed dog pivoted on said housing and having edge portions for biting into said bar in a spring-urged canted position of the dog to lock the housing on the bar in a tensioned condition of said band between the anchored ends thereof and against the resiliency of a tire about the outer tread periphery of which said band is engaged, a second spring-pressed dog having edge portions adapted to bite into said bar in an oppositely canted position in which the dog is locked on the bar, an operating lever pivoted on said housing and having an extension engageable with said second dog, whereby forward pivotal movement of said lever fulcrums said lever extension on the locked second dog and urges said housing forwardly along the bar to increase the tension of said band, said forward movement of said housing thereby urging said first dog to a new position along the bar, but the tendency of said housing yieldingly to reverse travel thereof upon reversing the stroke of said lever permitting said first dog to be yieldingly canted and locked in said new position on the bar, releasably operable anchoring means being provided at spaced points along the said support for selective attachment of said other end of said band to the support.

3. Apparatus for mounting tires on vehicle rims, comprising a member including an elongated rigid base having longitudinally spaced angular extensions, said base having an arcuate radially inwardly presented face adapted to engage against the outer tread periphery of a tire, a rigid bar affixed between said extensions to coextend in spaced relation to said base radially outwardly of the same to be concentrically arcuate with respect to said tread periphery, a housing slidable along said bar, a split band of substantially inextensible material anchored at one end thereof to said housing and at the other end to said member, a first spring-pressed dog pivoted on said housing and having edge portions for biting into said bar in a spring-urged canted position of the dog to lock the housing on the bar in a tensioned condition of said band between the anchored ends thereof and against the resiliency of a tire about the outer tread periphery of which said band is engaged, a second spring-pressed dog having edge portions adapted to bite into said bar in an oppositely canted position in which the dog is locked on the bar, an operating lever pivoted on said housing and having an extension engageable with said second dog, whereby forward pivotal movement of said lever fulcrums said lever extension on the locked second dog and urges said housing forwardly along the bar to increase the tension of said band, said forward movement of said housing thereby urging said first dog to a new position along the bar, but the tendency of said housing yieldingly to reverse travel thereof upon reversing the stroke of said lever permitting said first dog to be yieldingly canted and locked in said new position on the bar.

4. Apparatus of the character described, comprising an elongated, longitudinally arcuate, rigid support having angular extensions therefrom at longitudinally spaced points, a rigid arcuate bar affixed between said angular extensions to coextend in spaced relation to said support, a load-supporting housing slidably mounted on said bar between said extensions, mechanical advantage means in said housing operable for progressively advancing said housing to locked load-supporting positions along said bar, and means on said support for supporting a load thereon in direction opposed to the direction of the load stress on said housing in the locked positions of said housing on said bar.

References Cited in the file of this patent

UNITED STATES PATENTS

| | | |
|---|---|---|
| 734,512 | Christopher | July 28, 1903 |
| 1,597,926 | Seifert | Aug. 31, 1926 |
| 1,966,580 | Bull | July 17, 1934 |
| 2,262,429 | Lucker | Nov. 11, 1941 |
| 2,684,112 | Coats | July 20, 1954 |

FOREIGN PATENTS

| | | |
|---|---|---|
| 111,513 | Sweden | Aug. 15, 1944 |
| 246,955 | Switzerland | Nov. 1, 1947 |